3,215,656
UNSATURATED POLYESTER RESINS
Karl Raichle, Krefeld-Urdingen, and Clemens Niehaus, Krefeld-Bockum, Germany, assignors to Farbenfabriken Bayer Aktiengesellschaft, Leverkusen, Germany, a corporation of Germany
No Drawing. Filed June 28, 1960, Ser. No. 39,217
Claims priority, application Germany, July 10, 1959, F 28,896
5 Claims. (Cl. 260—26)

The present invention is concerned with new unsaturated polyester resins and particularly with new liquid lacquer compositions adapted for polymerisation in the presence of air to cured coatings with improved ability to be buffed and polished.

The use of hardenable mixtures of unsaturated polyesters containing the residues of $\alpha,\beta$-unsaturated ethylene carboxylic acids, and of copolymerisable ethylene compounds, such as vinyl, acrylic, methacrylic or allyl compounds, which mixtures are referred to as "unsaturated polyester resins," as lacquer raw materials is known. For hardening, the unsaturated polyester resins are mixed before or during the working-up with polymerisation-inducing catalysts, such as organic peroxides which decompose with the formation of free radicals, optionally in combination with accelerators, such as soluble heavy metal compounds and especially cobalt compounds.

Unsaturated polyesters of the type mentioned, are obtained, for example, by esterification of $\alpha,\beta$-unsaturated ethylene dicarboxylic acids or their anhydrides, such as maleic acid, fumaric acid, itaconic acid or dimeric methacrylic acid, optionally in admixture with dicarboxylic acids free of ethylenic unsaturation, such as adipic acid, phthalic acid, tetrachloro-phthalic acid or the Diels-Alder adduct of maleic anhydride and hexachloro-cyclopentadiene, with polyhydric and especially dihydric alcohols, such as ethylene glycol, diethylene glycol, propane-1,2-diol, butane-1,2-diol, butane-1,4-diol and hydroxy-alkylated bisphenols, whereby hydroxy-carboxylic acids, monohydric alcohols and monobasic carboxylic acids can be used at the same time. Colophony has already been incorporated in such unsaturated polyesters in amounts of over 30 percent in order to obtain hardened products with improved thermal stability.

Unsaturated polyester resin lacquers based on unsaturated polyester obtained according to this preparative principle are worked up with an addition of paraffin which separates out during the hardening as a skin which is non-permeable to air on the surface of the lacquer film. Without the paraffin addition, no chemical surface drying occurs and one obtains thermoplastic and soluble surfaces which are frequently sticky.

Apart from these paraffin-containing polyester resin lacquers, polyester resin lacquers are also known which, because of the content of the polyester of ethereal oxygen, especially in the form of ether groups of the allyl and benzyl ether type, possess air-drying properties and, therefore, can be worked up without the addition of paraffin.

While the known air-drying polyester resin lacquers are particularly suitable for the production of lacquer coatings which no not require further subsequent treatment, in the case of the paraffin-containing polyester resin lacquers which yield a lacquer coating with an undesirable surface consisting of a paraffin layer, these can only be used in those cases where the subsequent treatment of the lacquer, for example, by buffing or polishing is carried out, particularly for industrial wood lacquering.

With the present state of the technology, the air-drying polyester resin lacquers mentioned above, however, do not fulfill the necessary requirements of such lacquers to be subsequently treated by the lightest possible carrying out of the buffing and polishing process to the same degree as the paraffin-containing polyester resin lacquers. With increasing content of ethereal oxygen, the ability to buff when dry admittedly increases, as has been ascertained, but the ability to be polished is reduced. On the other hand, in the case of working with paraffin additions, crystallising out of the paraffin at lower temperatures and, under certain conditions, cracking of the lacquer film on vertical surfaces particularly in the presence of additives giving thixotropic properties, occur, together with a reduction of the adhesion of the lacquer layer. Furthermore, before putting on a further coat of lacquer, it is necessary to buff off the first paraffin-containing lacquer layer.

We have now found that lacquerings with a good ability to be dry-buffed and to be polished made from paraffin-free polyester resin lacquers based on unsaturated polyesters with $\alpha,\beta$-unsaturated ethylene carboxylic acid residues and residues of the allyl or benzyl ether type, that is to say residues of ethers with a double bond in $\beta$-$\gamma$-position to ether oxygen, and copolymerisable ethylene derivatives are obtained if unsaturated polyesters or mixtures of unsaturated polyesters are used which additionally contain a total of about 12 to about 30 percent by weight, and particularly of about 15 to about 25 percent by weight, colophony (rosin) or the resin acids and resin alcohols obtained therefrom as ester components.

Amongst the resin acids and resin alcohols obtainable from colophony, there may be mentioned, by way of example, the resin acids naturally-occuring as constituents of colophony, such as, particularly, abietic acid, the resin acids obtained by hydrogenation, disproportionation or polymerisation of the natural acids, such as hydrogenated colophony, dehydro-abietic acid, di- and tetra-hydro-abietic acid and polymerised colophony, as well as the resin alcohols obtained by reduction or hydrogenation of resin acids, such as abietyl alcohol and hydroabietyl alcohol.

The improved ability to be polished, and the simultaneous good ability to be dry buffed is only achieved by the addition of the given amounts of the mentioned resin components. The more the resin content is increased above the upper limit the less are the requirements of the ability to be dry buffed fulfilled. On the other hand, if the lower limit is passed, then no advantages with regard to the polishing properties are obtained in comparison with the resin-free polyester resins.

Particularly good results are obtained if the polyester contains, per 100 g., more than about 0.20 mol $\alpha,\beta$-unsaturated ethylene carboxylic acid residues and more than about 0.1 gram-atom of ethereal oxygen in the form of the mentioned ether groups and the content of the total ethereal oxygen, including the further ether components which may possibly be used, such as di- or tri-ethylene glycol incorporated ethereal oxygen, does not amount to more than about 0.5 gram-atom per 100 g. polyester.

The polyester resin lacquers of this invention can contain not only a uniform unsaturated polyester but also mixtures of different unsaturated polyesters. In the case of using a uniform polyester, the content of the resin components must lie within the stated limits. However, if one uses mixtures of different unsaturated polyesters, then a part of the polyester can contain more than the stated content of resin components, while the other part of the polyester can show a smaller content of resin components or can be resin-free. It is only necessary that the total content of the polyester material of resin components lies within the stated limits. Furthermore, it is not necessary that all of the unsaturated polyesters of the mixtures contain ethereal oxygen in the form of allyl or benzyl ether residues. A part of the polyester in the mixture can also be free of these groups. In this case, the latter polyesters can also be the carriers of the resin components.

The unsaturated polyesters which form the basis of the polyester resins according to the invention are characterised by outstanding air drying properties and can be produced in known manner, for example, by esterification of an $\alpha,\beta$-unsaturated ethylene carboxylic acid with an esterifying component which contains the mentioned ether residues, whereby the resin component corresponding to the given ratio and, if desired, polyhydric alcohols and/or carboxylic acids without olefinic double bonds in the $\alpha,\beta$-position to the carboxylic acid group, are used at the same time.

The production of the polyesters may be carried out in known manner, for example, according to the process described in German Patent No. 1,017,786 and United States patent applications Serial No. 635,981, filed January 24, 1957, now abandoned, and Serial No. 686,012 filed September 25, 1957, now abandoned.

Since the resin components generally possess a low esterification velocity in comparison with the remaining components of the polyester and, therefore, are sometimes not completely incorporated, it is frequently necessary to introduce the resin components in the form of a derivative which reacts more rapidly at temperatures permissible for the production of the polyester of up to about 200° C. Examples of these are, for example, the partial esters of a polyhydric alcohol which are producible at higher esterification temperatures, for example, of glycerol, pentaerythritol or trimethylol ethane or propane, with one of the resin acids or one of the polybasic carboxylic acids with the resin alcohol. Resin alcohols can also be introduced as partial ethers of polyhydric alcohols or as ethers of an epoxide alcohol or trimethylene oxide alcohol, as well as ethers of a hydroxy-carboxylic acid.

Resin acids and resin alcohols with conjugated double bonds, such as colophony and abietyl alcohol, can also be used in the form of their Diels-Alder adducts with dienophile compounds, such as maleic acid, maleic anhydride, maleic esters, acrylic acid, acrylonitrile, but-2-en-1,4-diol and allyl alcohol. Furthermore, it is to be taken into account that adduct formation during the production of the polyester can also take place with the $\alpha,\beta$-unsaturated ethylene carboxylic acid residues and the $\beta,\gamma$-unsaturated ether residues of the polyester. The losses of the unsaturated residues connected therewith, which are important for the properties of the polyester, are preferably compensated by introducing the dienophile polyester components in such amounts that a sufficient excess over the equivalent with the conjugated unsaturated component is ensured.

Thus the special object of the invention is a liquid lacquer composition adapted for polymerisation internally and externally in the presence of air to cured coatings with improved ability to be dry buffed and to be polished consisting of (A) polymerisable, ethylenically unsaturated polyester material prepared from carboxylic and alcoholic reactants selected from the group consisting of monocarboxylic and polycarboxylic acids, anhydrides and esters thereof, and mono- and polyhydric alcohols, esters thereof, epoxides and trimethylene oxides, at least one of said reactants being an ether compound selected from the group consisting of a partial ether which is a condensation product of alcohol with a double bond in $\beta,\gamma$-position to a hydroxyl group and of a polyalcohol, and an ether which is a condensation product of alcohol with a double bond in $\beta,\gamma$-position to a hydroxyl group and of a hydroxy carboxylic acid, said ether compound being in an amount to provide at least about 0.1 gram-atom ethereal oxygen in 100 g. polyester material, and at least one of said carboxylic reactants being an $\alpha,\beta$-ethylenically unsaturated carboxylic acid in an amount to provide at least about 0.2 mol radicals of said unsaturated carboxylic acid in 100 g. polyester material, at least a further one of said carboxylic and alcoholic reactants being a resin material selected from the group consisting of natural resin acids, acids obtained by hydrogenation, disproportionation, polymerisation and Diels-Alder adduction with a dienophile compound of natural resin acids, partial esters of resin alcohols with polybasic carboxylic acids, and etherification products of resin alcohols with hydroxy carboxylic acids, resin alcohols obtained by reduction of natural resin acids, hydrogenation of resin alcohols, partial esterification of resin acids with polyhydric alcohols, partial etherification of resin alcohols with a polyhydric alcohol, and Diels-Alder adduction of resin alcohol with a dienophile compound, said resin material amounts from about 12 to about 30 percent by weight of the polyester material, the total of carboxylic and alcoholic reactants being present in proportions ranging from substantially chemically equivalent proportions to about a 20 percent excess of hydroxyl groups, (B) from about 10 to about 150 percent by weight related to said unsaturated polyester material compatible, monomeric, copolymerisable, ethylenically unsaturated compounds selected from the group consisting of aromatic vinyl compounds, vinyl ketones, vinyl and allyl esters and acrylic and methacrylic esters and amides, and (C) catalysts usual for curing unsaturated polyester resins.

For the production of the unsaturated polyesters there may be used, for example, $\alpha,\beta$-ethylenically unsaturated carboxylic acids, such as acrylic, methacrylic, crotonic, maleic, fumaric, itaconic, citraconic and dimeric methacrylic acid or their anhydrides or esterifyable derivatives thereof, such as esters.

Besides these unsaturated acids there may be used, as mentioned above, certain quantities of natural resin acids or derivatives thereof, such as, for instance, rosin, abietic acid, dehydroabietic acid, di- and tetrahydroabietic acid, polymerised rosin, further partial esters of, for instance, abietyl, di- and tetrahydroabietyl alcohol with polybasic acids such as succinic acid, glutaric acid, adipic acid, pimelic acid, sebacic acid, phthalic acid, isophthalic acid, terephthalic acid, trimellith acid, butane-tricarboxylic acid, maleic acid, fumaric acid, itaconic acid, citraconic acid and the like, etherification products of resin alcohols with hydroxy carboxylic acids, such as lactic acid, $\epsilon$-hydroxy capronic acid and the like, and, finally, Diels-Alder adducts of, for instance, abietic acid with dienophile compounds, such as maleic acid, maleic anhydride, maleic esters, acrylic and methacrylic acid, acrylic and methacrylic esters, acrylic and methacrylic nitrile, but-2-en-1,4-diol, and allyl alcohol.

Also there may be used, if desired, other mono- and polybasic acids, such as, for instance, propionic acid, butyric acid, valeric acid, benzoic acid, butyl benzoic acid, succinic acid, glutaric acid, adipic acid, pimelic acid, sebacic acid, phthalic, isophthalic, terephthalic and tetrachlorophthalic acid, the Diels-Alder adduct of maleic anhydride and hexachlorocyclopentadiene trimellith acid, butane-tricarboxylic acid and the like, further hydroxy carboxylic acids, such as lactic acid, $\epsilon$-hydroxy capronic acid and the like.

As suitable organic hydroxy compounds which may be used for the production of the polyesters there may be mentioned, for example, monohydric alcohols such as amyl, isooctyl, cetyl, allyl, methallyl alcohol and the like, dihydric alcohols, such as ethylene glycol, diethylene glycol, triethylene glycol, polyethylene glycols, propylene glycol, polypropylene glycols, butylene glycols, bis-oxethylated or -propylated bis-(p-hydroxy-phenyl)-alkanes and -cycloalkanes, for instance, -propane and -cyclohexane, bis-(hydroxy-cyclohexyl)-alkanes and -cycloalkanes, for instance, -propane and -cyclohexane, the xylylene glycols and the like, and polyhydric alcohols, such as glycerol, trimethylolethane, trimethylolpropane and -butane, pentaerythritol, sorbit, 2,2,6,6-tetramethylolcyclohexanol and the like.

Besides these hydroxy compounds there may be used, as mentioned above, certain quantities of resin alcohols obtained by reduction of resin acids, such as abietyl alcohol, or by hydrogenation of abietyl alcohol, for instance, hydroabietyl alcohols, further partial esterification products of resin acids with polyhydric alcohols, such as abietic, dehydroabietic acid, rosin and hydrogenated rosin mono- and diesters with glycols, mentioned above, glycerol, trimethylol ethane, -propane and -butane, pentaerythritol mono-, di- and triesters of such acids, and the like, and partial ethers of, for instance, abietyl alcohol and a polyhydric alcohol, such as glycols mentioned above, glycerol, trimethylolethane, -propane and -butane, pentaerytritol and the like.

As carboxylic and alcoholic reactants which are condensation products of alcohol with a double bond in $\beta,\gamma$-position to a hydroxyl group with a hydroxy carboxylic acid or with a polyhydric alcohol, which are also to be used for the production of the unsaturated polyesters according to the invention there may be mentioned, for example, allyl oxyacetic acid, methallyloxyacetic acid, chloroallyloxyacetic acid, crotyloxyacetic acid, benzyloxyacetic acid, $\alpha$-allyloxypropionic acid, $\alpha$-methallyloxypropionic acid, $\beta$-methallyloxypropionic acid, $\beta$-chloroallyloxypropionic acid, $\alpha$-allyloxybutyric acid, $\alpha$-methallyloxybutyric acid, $\beta$-allyl-oxybutyric acid, $\beta$-methallyloxybutyric acid, $\gamma$-allyloxybutyric acid, $\gamma$-methallyloxybutric acid, $\gamma$-allyloxyisobutyric acid, $\gamma$-methallyloxyisobutyric acid, $\epsilon$-allyloxycapronic acid, $\epsilon$-methallyloxycapronic acid, allyloxysuccinic acid, methallyloxysuccinic acid, $\alpha$-allyloxyglutaric acid, $\alpha$-methallyloxyglutaric acid, $\beta$-allyloxyglutaric acid, $\beta$-methallyloxylglutaric acid, $\alpha$-allyloxyadipic acid, $\alpha$-methallyloxyadipic acid, $\beta$-allyloxyadipic acid, $\beta$-methallyloxyadipic acid, $\alpha,\alpha'$-diallyloxyadipic acid, $\alpha,\alpha'$-dimethallyloxyadipic acid, and derivatives of such acids which are able to form esters with hydroxy compounds, such as esters and anhydrides of such acids, and ethers of allyl-, methallyl-, ethallyl-, chloroallyl-, crotyl-, cinnamyl-, benzyl alcohol, methylvinylcarbinol and 1,4-butenediol with polyhydric alcohols, such as ethylene glycol, diethylene glycol, polyethylene glycols, propylene- and polypropylene glycols, butylene glycol, xylylene glycols, bis-oxethylated or -propylated bis-(p-hydroxyphenyl)-alkanes and -cycloalkanes, bis-(hydroxycyclohexyl)-alkanes and -cycloalkanes, glycerol, trimethylolethane, -propane and -butane, pentaerythritol and the like. Special representatives of these compounds are, for instance, trimethylol propane mono-allyl ether, glycerol $\alpha$-allyl ether, trimethylolpropane diallyl ether, trimethylol propane allyl benzyl ether, trimethylol ethane mono-methallyl ether, trimethylolpropane monocrotyl ether, trimethylolpropane methylvinylcarbinyl ether, pentaerytritol mono-, di- and tri-allyl ether, 2,2,6,6-tetramethylol-cyclohexanol triallyl ether, 1,4-butenediol-monoethyl or allyl ether, glycid-allyl ether and the like.

The unsaturated polyesters, which are preferably stabilised with a polymerisation inhibitor, are mixed with a copolymerisable ethylene compound, such as styrene, vinyl toluene, divinyl benzene, vinyl esters, methacrylic acid esters, triacrylic-formal or triallyl cyanurate, to give the polyester resin.

The so-obtained unsaturated polyester resins can, in the same way as other unsaturated polyester resins, be used in many ways and can be converted into hardened products in the usual manner with the help of compounds forming free polymerisation-inducing radicals, for example, organic peroxides, such as benzoyl peroxide, cyclohexanone hydroperoxide, methyl ethyl ketone hydroperoxide, cumene hydroperoxide, or azo compounds such as azo-isobutyric acid nitrile.

For catalysing for an application as a lacquer, according to the present invention there are particularly suitable the catalyser-accelerator combinations which are already effective at room temperature or slightly elevated temperatures, such as those of a hydro-peroxide and a soluble heavy metal compound, especially a cobalt compound, such as cobalt naphthenate, cobalt octoate or cobalt acetoacetate. At the same time, the accelerating component displays a siccative effect which is necessary for the hardening of the surfaces with the admission of air if drying is to be carried out at temperatures below about 100° C. Therefore, for rendering possible lower drying temperatures with the commencement of the hardening by another radical formation, such as thermal decomposition of the catalyst at temperatures below about 100° C. or reaction of a diacyl peroxide with an accelerator component of the tertiary amine type, additions of drying materials, such as the cobalt, lead and manganese compounds usual in the lacquer industry, are necessary. The polyester lacquers according to the invention can, after catalysing with such drying materials, also be worked up without the addition of radical forming catalysts if the lacquers are not to be put on in very thick layers.

The polyester resins according to the invention can be used as clear lacquers but they can also be mixed with pigments and fillers, for example, for coating lacquers or for surfacing materials. If desired, inert lacquer solvents, such as hydrocarbons, esters and ketones, for example, toluene, xylene, ethyl acetate and acetone, can be added. In the case of using polyester resins which are not fluid enough at room temperature, particularly those which contain no liquid ethylene compound, the use of such inert solvents is necessary. Furthermore, other lacquer binding agents may also be added, such as nitrocellulose, oil modified alkyd resins and urea-formaldehyde and melamine-formaldehyde condensates etherified by alcohols.

The finished lacquerings, for example, on wood, plastics, metal and concrete, are characterised by a very good polishability so that, in some cases, a previous bufling can be omitted.

The following examples are given for the purpose of illustrating the present invention:

EXAMPLE 1

980 parts by weight (10 mols) of maleic anhydride, 449 parts by weight (2.1 mols) of trimethylol propane diallyl ether, 586 parts by weight (9.5 mols) of ethylene glycol and 456 parts by weight (1.075 mols) of the partial ester obtained by esterification of equimolecular amounts of hydrogenated colophony and trimethylol propane are, after the addition of 0.02 percent hydroquinone, esterified by melt condensation at 180° C. in a nitrogen atmosphere until the acid number has dropped to about 17. After cooling to about 80° C., the so-obtained polyester, which contains 14.9 percent of combined hydrogenated colophony, is dissolved in vinyl toluene to give a 55 percent solution.

140 parts by weight of this unsaturated polyester resin are mixed with 7 parts by weight of a 40 percent methyl ethyl ketone hydroperoxide solution and 1.6 parts by weight of a 20 percent cobalt naphthenate solution in toluene and immediately afterwards put on to a sheet of wood with the aid of a spray gun. The lacquer coating, which is dried out after 6 to 7 hours at a room temperature of 23° C., is non-tacky and is hardened through independently of the coating thickness given, after a total drying time of 15 hours, can be dry buffed not only by hand but also mechanically, for example, with a band-buffing machine. By subsequent polishing with the help of a buffing wheel or a band-buffing machine provided with a polishing band, an excellent high gloss is obtained in a very short time. The subsequently treated lacquer coating is characterised by a good stability against scratching and excellent adhesion.

EXAMPLE 2

A polyester containing 23.3 percent combined colophony is produced by the polycondensation of a mixture of 980 parts by weight (10 mols) of maleic anhydride, 535 parts by weight (2.5 mols) of trimethylol propane diallyl ether, 521 parts by weight (8.4 mols) of ethylene glycol and 844 parts by weight (2.0 mols) of the esterification product of equimolecular amounts of colophony and trimethylol propane. 540 parts by weight of this unsaturated polyester with an acid number of 18 are dissolved in 400 parts by weight toluene with the addition of 60 parts by weight triallyl cyanurate. The viscosity of this polyester resin solution used for lacquering a sheet of wood amounts to 51 seconds measured in a number 4 DIN beaker at 20° C.

Before spraying, 5 percent of a commercial cyclohexanone peroxide paste and 2.5 percent of a 20 percent cobalt octoate solution in toluene are mixed therewith. A lacquer coating with good adhesion is obtained which dries at a room temperature of 23° C. in the course of 7 hours. After a further 7 hours, it can be dry buffed without difficulty and can quickly be polished to a high gloss.

The unsaturated polyesters forming the basis of the further examples are given in Table I in order of decreasing resin component content. All the polyesters are stabilized with 0.02 percent hydroquinone either by addition to the mixture of the components before the esterification or to the final polyester.

Table I

| Polyester | Percent resin component | Components used for the production | Molar ratio | Acid number |
|---|---|---|---|---|
| 3 | 35.2 | Hydrogenated colophony<br>Maleic anhyride<br>Trimethylolpropane-diallyl ether<br>Ethylene glycol<br>Trimethylolpropane | 0.37<br>1.0<br>0.33<br>0.62<br>0.37 | 17 |
| 4 | 29.8 | Hydrogenated colophony<br>Maleic anhydride<br>Trimethylol propane-diallyl ether<br>Triethylene glycol<br>Trimethylol propane | 0.35<br>1.0<br>0.6<br>0.5<br>0.35 | 15 |
| 5 | 27.2 | Hydrogenated colophony<br>Fumaric acid<br>Trimethylol propane-monobenzyl ether<br>Triethylene glycol<br>Trimethylol propane | 0.3<br>1.0<br>0.4<br>0.45<br>0.3 | 18 |
| 6 | 23.3 | Colophony<br>Maleic anhydride<br>Trimethylol propane diallyl ether<br>Ehtylene glycol<br>Trimethylol propane | 0.185<br>1.0<br>0.25<br>0.84<br>0.185 | 18 |
| 7 | 20.6 | Hydrogenated colophony<br>Maleic anhydride<br>Glycerol diallyl ether<br>Butan-1,3-diol<br>Trimethylol propane | 0.16<br>1.0<br>0.25<br>0.76<br>0.16 | 28 |
| 8 | 19.9 | Hydrogenated colophony<br>Maleic anhydride<br>Trimethylol propane-diallyl ether<br>Phthalic anhydride<br>Ethylene glycol | 0.14<br>0.9<br>0.2<br>0.1<br>1.07 | 24 |
| 9 | 19.8 | Hydrogenated colophony<br>Fumaric acid<br>Trimethylol propane-monobenzyl ether<br>Triethylene glycol<br>Trimethylol propane | 0.2<br>1.0<br>0.4<br>0.55<br>0.2 | 18 |

Table 1—Continued

| Polyester | Percent resin component | Components used for the production | Molar ratio | Acid number |
|---|---|---|---|---|
| 10 | 19.6 | Colophony<br>Maleic anhydride<br>Pentaerythritol diallyl ether<br>Ethylene glycol<br>Trimethylol propane | 0.14<br>1.0<br>0.23<br>0.8<br>0.14 | 28 |
| 11 | 16.1 | Hydroabietyl alcohol (commercial)<br>Maleic anhydride<br>Trimethylol propane-diallyl ether<br>Ethylene glycol | 0.11<br>1.0<br>0.21<br>1.0 | 14 |
| 12 | 14.9 | Hydrogenated colophony<br>Maleic anhydride<br>Trimethylol propane-diallyl ether<br>Ethylene glycol<br>Trimethylol propane | 0.1<br>1.0<br>0.21<br>0.95<br>0.1 | 27 |
| 13 | 13.5 | Colophony<br>Maleic anhydride<br>Trimethylol propane-diallyl ether<br>Ethylene glycol<br>Trimethylol propane | 0.09<br>1.0<br>0.21<br>0.97<br>0.09 | 19 |
| 14 | 12.4 | Hydrogenated colophony<br>Maleic anhydride<br>Trimethylol propane-diallyl ether<br>Ethylene glycol<br>Trimethylol propane | 0.08<br>1.0<br>0.2<br>0.97<br>0.08 | 20 |
| 15 | 9.6 | Colophony<br>Maleic anhydride<br>Trimethylol propane-diallyl ether<br>Ethylene glycol<br>Trimethylol propane | 0.06<br>1.0<br>0.2<br>1.0<br>0.06 | 20 |

By dissolving the polyesters in equal amounts of styrene, the polyester lacquers of Table II are obtained. The examples are given the same numbers as the polyesters of Table I on which they are based. The viscosity values refer to the measurement of the lacquer in a number 4 DIN beaker at 20° C. All the lacquers are catalysed in the same manner with 4 percent of a 50 percent cyclohexanone hydroperoxide paste and 0.75 percent of a 20 percent cobalt naphthenate solution in toluene and put on to sheets of wood with a spray gun. The results obtained with the lacquerings with regard to bufferability and polishabilty 15 hours after putting on, which lacquerings are non-tacky and hardened through at drying temperatures of 22 to 27° C. after only 5 to 7 hours are given in Table 2.

Table II

| Polyester lacquer example | Viscosity | Dry buffability | Polishability |
|---|---|---|---|
| 3 | 29 | 3 | 0 |
| 4 | 25 | 2 | 0 |
| 5 | 41 | 2 | 0-1 |
| 6 | 30 | 1 | 0 |
| 7 | 28 | 1 | 0 |
| 8 | 29 | 1 | 0-1 |
| 9 | 30 | 1 | 2 |
| 10 | 40 | 1 | 0-1 |
| 11 | 22 | 1 | 1 |
| 12 | 27 | 1 | 1 |
| 13 | 30 | 1 | 1-2 |
| 14 | 29 | 1 | 1-2 |
| 15 | 28 | 1 | 3 |

Dry buffability:
  1=very good.
  2=good.
  3=insufficient.

Polishability:
  0=excellent.
  1=very good.
  2=good.
  3=insufficient.

EXAMPLE 16

A 50 percent styrene solution of a polyester containing 41.2 percent by weight of combined hydrogenated colophony, which was obtained by esterification of 980 parts by weight (10 mols) of maleic anhydride with 675 parts by weight (7.5 mols) of 1,3-butanediol and 1830 parts by weight (4.35 mols) of a partial ester formed from equimolecular amounts of hydrogenated colophony and trimethylol propane is mixed with equal parts of a 50 percent styrene solution of a polyester produced from 980 parts by weight (10 mols) of maleic anhydride, 509 parts by weight (8.2 mols) of ethylene glycol and 1284 parts by weight (6.0 mols) of trimethylol propane diallyl ether. 100 parts by weight of the polyester mixture present in this solution contains 20.6 parts by weight of combined hydrogenated colophony, 0.345 mol of maleic acid residues and 0.232 gram-atom of allyl ether oxygen. After 0.7 percent of a 20 percent cobalt naphthenate solution in toluene and subsequently also 2 percent cyclohexanone hydroperoxide have been mixed into the so-obtained polyester alcohol, it is used in the previously described manner for the lacquering of a sheet of wood. The lacquer layer dried at a room temperature of 25° C., can be dry buffed on a band buffing machine and can be polished to a high gloss.

We claim:
1. A liquid coating composition which upon the addition of a catalyst selected from the group consisting of organic peroxides, metal driers, tertiary amines and mixtures thereof produces a film that dries rapidly and sets to a hard, completely homogeneous film capable of being dry-buffed and polished to a high gloss consisting essentially of
   (A) from about 10 to about 150 percent by weight related to the polyester condensation product (B) defined below of a monomeric, copolymerizable ethylenically unsaturated compound selected from the group consisting of aromatic vinyl compounds, vinyl ketones, vinyl esters, allylesters, acrylic esters, acrylic amides, methacrylic esters and methacrylic amides and
   (B) an unsaturated polyester condensation product formed by the esterification of carboxyl and hydroxyl-containing compounds in amounts between stoichiometric equivalents and a 20 percent stoichiometric excess of hydroxyl-containing compounds in such a manner that the unsaturated polyester condensation product contains in esterified form at least one compound of each of the following four groups
      (i) from 12 to 30 percent by weight of total condensation product of a member selected from the group consisting of rosin, hydrogenated rosin, abietyl alcohol, hydroabietyl alcohol and Diels-Alder adducts of rosin and dienophilic compounds,
      (ii) polyhydric alcohol
      (iii) partial ethers of polyhydric alcohol and $\beta,\gamma$-unsaturated monohydric aliphatic alcohol containing at least one uncombined hydroxyl group in an amount to provide at least about 0.1 gram of etheral oxygen in 100 grams of total condensation product and
      (iv) members selected from the group consisting of $\alpha,\beta$-ethylenically unsaturated carboxylic acids and anhydrides thereof in an amount sufficient to provide at least about 0.2 mol radicals in 100 grams of total condensation product.

2. A liquid composition as defined in claim 1 in which the polyhydric alcohol is a member of the group consisting of ethylene glycol, trimethylolpropane, trimethylene glycol, and 1,2-butanediol.

3. A liquid composition as defined in claim 1 in which the partial ether of a polyhydric alcohol and an unsaturated monohydric aliphatic alcohol is a member of the group consisting of the monobenzyl and the diallyl ethers of trimethylolpropane, the diallyl ether of pentaerythritol, and the diallyl ether of glycerol.

4. A liquid coating composition which, upon the addition of an organic peroxide and a metal siccative, produces a film that dries rapidly and sets to a hard completely homogeneous film that is capable of being dry-buffed and polished to a high gloss, consisting essentially of a solution in vinyltoluene of an unsaturated polyester condensation product produced by the reaction at a temperature of about 180° C. of
   (i) approximately 10 mols of maleic anhydride,
   (ii) approximately 2.1 mols of the diallyl ether of trimethylolpropane,
   (iii) approximately 9.5 mols of ethylene glycol, and
   (iv) approximately 1.08 mols of the partial ester formed from equimolecular proportions of trimethylolpropane and hydrogenated rosin.

5. A liquid coating composition which, upon the addition of an organic peroxide and a metal siccative, produces a film that dries rapidly and sets to a hard completely homogeneous film that is capable of being dry-buffed and polished to a high gloss, consisting essentially of a solution in styrene of equal parts by weight of two unsaturated polyester condensation products,
   (a) the first polyester condensation product of which is produced by heating together a mixture of
      (i) approximately 10 mols of maleic anhydride,
      (ii) approximately 7.5 mols of 1,3-butanediol, and
      (iii) approximately 4.35 mols of the partial ester formed from equimolecular proportions of trimethylolpropane and hydrogenated rosin, and
   (b) the second polyester condensation product of which is produced by heating together a mixture of
      (i) approximately 10 mols of maleic anhydride,
      (ii) approximately 8.2 mols of ethylene glycol, and
      (iii) approximately 6.0 mols of the diallyl ether of trimethylolpropane.

References Cited by the Examiner

UNITED STATES PATENTS

| 2,443,739 | 6/48 | Kropa | 260—22 |
| 2,563,870 | 8/51 | Rust et al. | 260—22 |
| 2,563,871 | 8/51 | Rust et al. | 260—22 |
| 2,563,872 | 8/51 | Rust et al. | 260—22 |
| 2,563,873 | 8/51 | Rust et al. | 260—22 |
| 2,598,663 | 6/52 | Kropa | 260—22 |
| 2,606,883 | 8/52 | Hoover | 260—22 |
| 2,957,837 | 10/60 | Smith et al. | 260—22 |
| 2,973,332 | 2/61 | Fikentscher et al. | 260—26 |

FOREIGN PATENTS 460,392 10/48 Canada.

WILLIAM H. SHORT, *Primary Examiner.*

A. D. SULLIVAN, M. STERMAN, *Examiners.*